United States Patent [19]
Gullberg

[11] Patent Number: 6,039,497
[45] Date of Patent: Mar. 21, 2000

[54] METHOD FOR COUPLING AND A COUPLING DEVICE

[75] Inventor: Lars Gullberg, Vasa, Finland

[73] Assignee: Wartsila Diesel International Ltd Oy, Helsinki, Finland

[21] Appl. No.: 08/911,104

[22] Filed: Aug. 12, 1997

[30] Foreign Application Priority Data

Aug. 13, 1996 [FI] Finland ..................................... 963172

[51] Int. Cl.$^7$ ....................................................... F16B 2/14
[52] U.S. Cl. ............................. 403/16; 403/15; 403/337; 403/370
[58] Field of Search .............................. 403/31, 337, 338, 403/370, 371, 367, 368, 373, 374.1, 374.2, 374.3, 374.4, 15, 16

[56] References Cited

U.S. PATENT DOCUMENTS

| | | |
|---|---|---|
| 1,960,045 | 5/1934 | Beal . |
| 4,089,613 | 5/1978 | Babbit, Jr. ........................... 403/370 X |
| 4,095,908 | 6/1978 | Schafer et al. ............................ 403/16 |
| 4,192,621 | 3/1980 | Barth . |
| 4,425,050 | 1/1984 | Durand ..................................... 403/15 |
| 4,496,259 | 1/1985 | Foucher . |
| 5,551,794 | 9/1996 | Aarre et al. .......................... 403/374.4 |
| 5,649,778 | 7/1997 | Lin ........................................... 403/31 |
| 5,775,831 | 7/1998 | Mullenberg .............................. 403/337 |

FOREIGN PATENT DOCUMENTS

| | | |
|---|---|---|
| 477707 | 4/1992 | European Pat. Off. ............... 403/370 |
| 24 45 252 | 5/1975 | Germany . |
| 26 37 756 | 3/1977 | Germany . |
| 35 07 452 | 1/1986 | Germany . |
| 817028 | 7/1959 | United Kingdom . |
| 88/02074 | 3/1988 | WIPO . |

*Primary Examiner*—Harry C. Kim
*Attorney, Agent, or Firm*—Smith-Hill and Bedell

[57] ABSTRACT

A first shaft provided with a flange having a through bore is coupled to a second shaft provided with a flange having a blind bore aligned with the through bore in the flange of the first shaft using a coupling device including an adapting bolt having an external tapered surface and an axial hole open at the narrower end of the adapting bolt and a cylindrical sleeve element having an internal tapered surface corresponding to the external tapered surface of the adapting bolt, the adapting bolt being within the sleeve element. The coupling device is fitted in the aligned bores so that the narrower end of the adapting bolt is toward the flange of the first shaft and an end surface of the sleeve element is exposed. A tool is fitted in the axial hole in the adapting bolt and a force is applied to the tool tending to displace the adapting bolt relative to the sleeve element in the direction from the wider end of the adapting bolt toward the narrower end thereof.

14 Claims, 2 Drawing Sheets

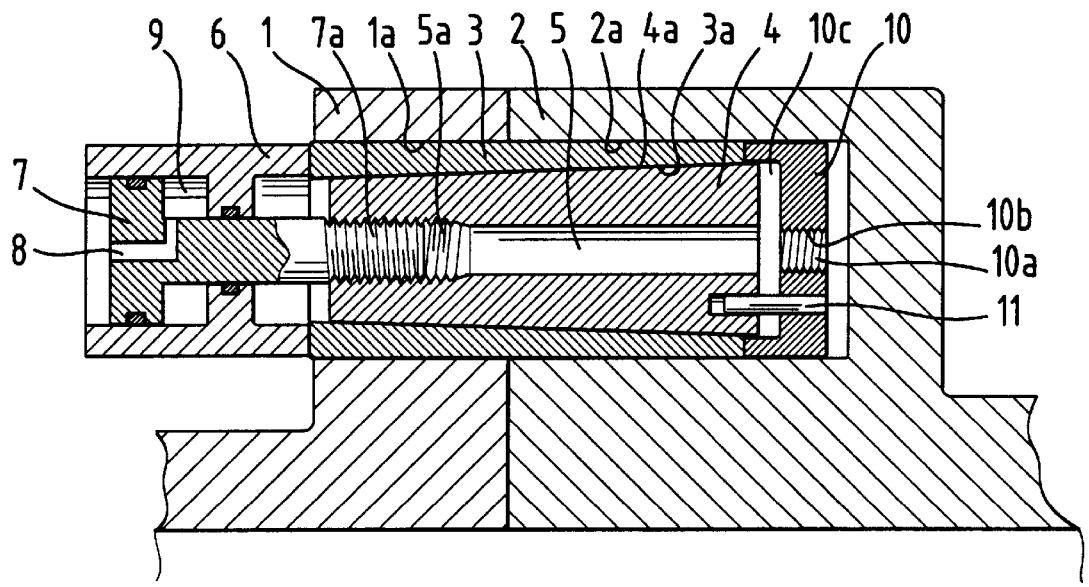
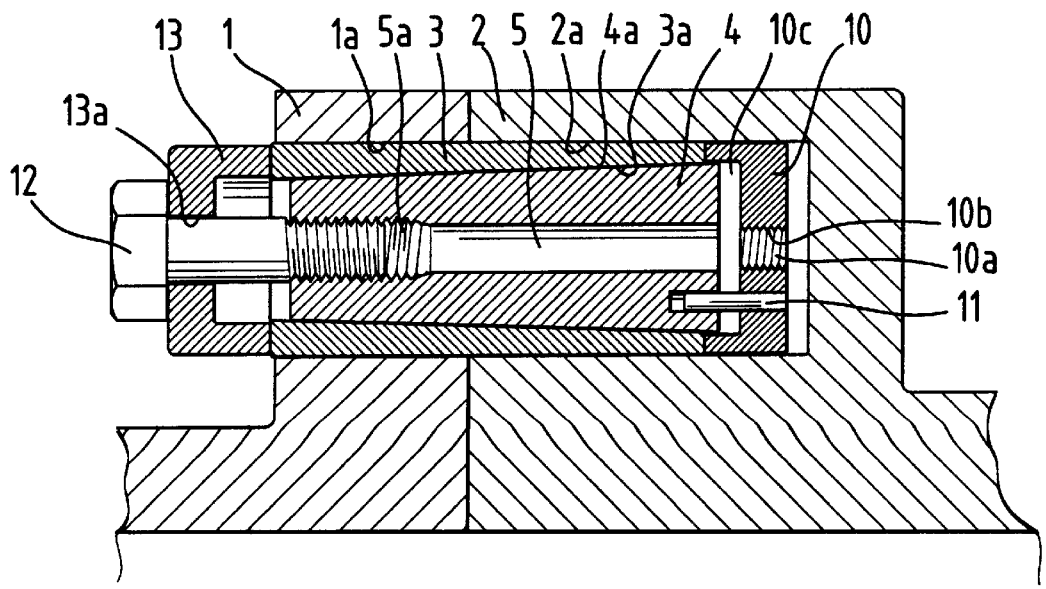

METHOD FOR COUPLING AND A COUPLING DEVICE

BACKGROUND OF THE INVENTION

The invention relates to a method for coupling and to a coupling device.

Different solutions are known for connecting together two shafts or shaft parts provided with flanges. The solution shown in U.S. Pat. No. 4,192,621 utilizes a cylindrical sleeve element having an internally tapered surface and an externally tapered stud bolt inserted in the sleeve element. Because of the compatible tapered surfaces the sleeve element fastens tightly into the bore of the flanges when the stud bolt is forced axially relative to the sleeve element in the direction from the wider end of the taper toward the narrower end of the taper. This tight fastening makes transmission of high axial torque forces possible. In addition, the stud bolt has a threaded extension at each end onto which a nut is fastened. In this manner, the stud bolt is placed under tension, whereby the flanges are clamped securely together and the solution is rendered well suited also for high bending moments. However, this known solution is suitable only for fastening of flanges provided with through-going bores.

SUMMARY OF THE INVENTION

An aim of the invention is to provide a coupling device for coupling two shaft parts together by means of a flange joint in the case where the bore of the second flange is provided with a stationary or fixed bottom, i.e. the bore is blind, but in which, however, tapered surfaces are desired to be utilized so that the shaft joint thus is suitable especially for the transmission of a high axial torque force. The invention is particularly directed to couplings for a crankshaft or camshaft of a large diesel engine. A further aim of the invention is to provide a coupling device which is structurally simple and reliable and the assembling and disassembling of which is as simple and rapid as possible.

In the method according to the invention, the coupling device, which includes a sleeve element and an adapting bolt arranged within the sleeve element, is inserted in the aligned bores in the flanges so that the narrower end of the tapered adapting bolt remains on the side of the flange having the through-going bore. Fastening of the coupling device in the bores of the flanges is accomplished by forcing the adapting bolt and the sleeve element axially with respect to each other by applying a pulling force to the adapting bolt by making use of an axial hole in the adapting bolt and preferably extending through the whole adapting bolt and using the end surface of the sleeve element as support for the counterforce needed.

The compressing of the adapting bolt tightly to the sleeve element can with advantage be accomplished hydraulically using a separate cylindrical supporting sleeve supported to the sleeve element and a piston member hydraulically movable relative to the supporting sleeve and having a rod in threaded engagement with the adapting bolt. Alternatively the compressing can be accomplished mechanically by utilizing a tightening screw bolt in threaded engagement with the hole in the adapting bolt and a support piece between the tightening screw bolt and the sleeve element and engaging the sleeve element.

In a shaft joint arrangement according to the invention for applying the method described above the adapting bolt is arranged within the sleeve element and the joint thus formed is installed in the bores in the flanges so that the narrower end of the tapered adapting bolt is toward the flange with the through-going bore. In addition the adapting bolt is provided with an axial hole, preferably a through-going hole, for providing the mutual fastening or locking of the adapting bolt and the sleeve element and at the same time the fastening or locking thereof to the interior surfaces of the bores in the flanges.

The through-going hole in the adapting bolt is provided with threads at least at the narrower end of the adapting bolt for applying force in the axial direction to the adapting bolt.

In practice the adapting bolt is advantageously shorter than the combined thickness of the flanges. In addition the tapered surface of the adapting bolt extends preferably over the whole length of the adapting bolt. Further the adapting bolt and the sleeve element can with advantage be essentially of equal length. In this way the flange joint requires as little space as possible.

A separate end piece is advantageously arranged inward of the coupling device. The end piece has an annular abutment shoulder which engages the end of the sleeve element and surrounds a recess which allows movement of the adapting bolt in the axial direction for detaching the adapting bolt from the sleeve element. The end piece is provided with a through-going hole which is coaxial with the hole in the adapting bolt. The hole in the end piece is provided with threads for engaging a releasing tool for the joint. The end piece is further provided with a means, for example a pin, to prevent turning of the end piece relative to the adapting bolt. By turning the releasing tool while the end piece is held against rotation, release of the joint can be simply and quickly accomplished.

BRIEF DESCRIPTION OF THE DRAWINGS

In the following the invention is described as a way of example with reference to the drawings, in which FIG. 1 shows a joint according to the invention as an axial section, whereby the assembling is provided by hydraulic means, FIG. 2 shows a joint according to FIG. 1 as an axial section, whereby the assembling is alternatively provided mechanically.

DETAILED DESCRIPTION

Figure 3:
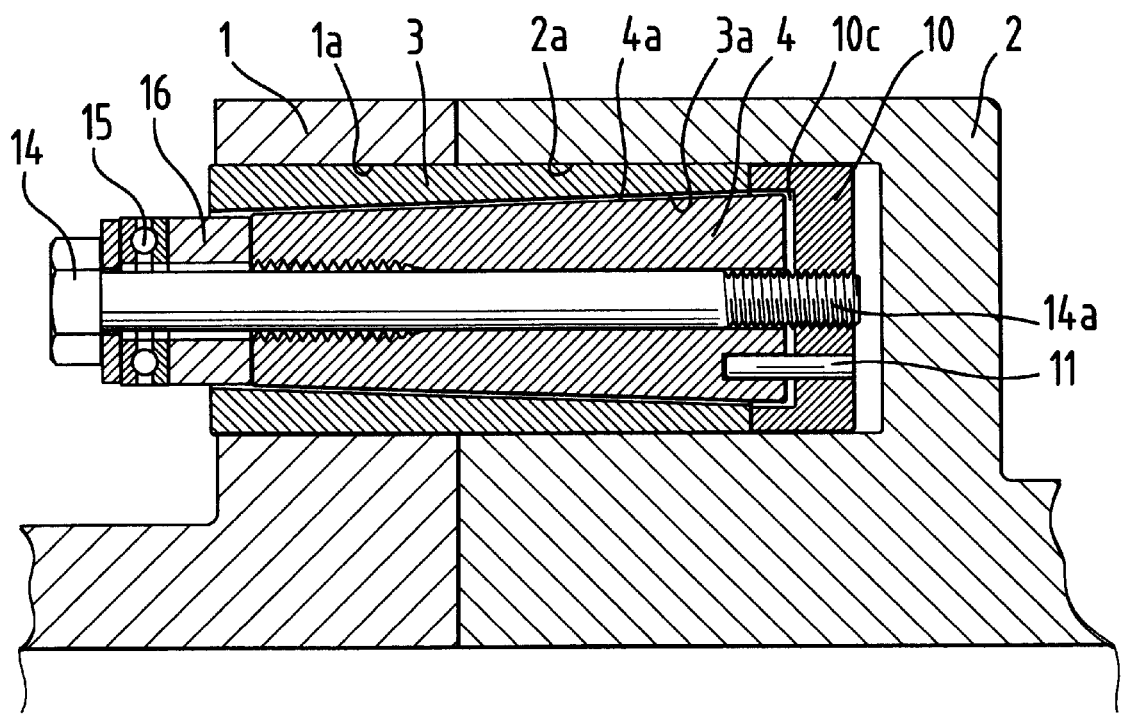
FIG. 3 shows disassembling of the joint according to FIG. 1.

In the drawing 1 and 2 indicate flanges, which are included in shafts not shown in more detail. The flange 1 has a through-going bore 1a and the flange 2 has a bore 2a with a closed or fixed bottom (blind bore). In the cylindrical cavity formed jointly by the bores there is a sleeve element 3 enclosing an adapting bolt 4. Fastening the sleeve element 3 and the adapting bolt 4 together takes place by utilizing tapered counter surfaces 3a and 4a, the tapering of which has been exaggerated in the figures for clarity. The adapting bolt 4 has an axial through-going hole 5 provided with an internal screwthread 5a at one end.

In the case of FIG. 1, a hydraulic means is used for assembling the joint. A supporting sleeve 6 engages the end of the sleeve element 3 and a piston member 7, which includes a pin or rod having threads 7a engaging the threads 5a of the hole 5 in the adapting bolt 4, is fitted in a cylinder formed by the sleeve 6. The piston member 7 is formed with a passage 8 for feeding hydraulic medium under pressure from a not shown feeding device into a chamber 9 between the piston member 7 and the supporting sleeve 6. As a result of the feeding of the hydraulic medium into the chamber 9, the piston member 7 and the sleeve 6 exert a force between the adapting bolt 4 and the sleeve element 3. The piston member 7 moves to the left in the figure relative to the supporting sleeve 6, at the same time pulling the adapting bolt 4 also to the left in the figure relative to the sleeve element 3, which remains in its place due to the supporting sleeve 6. Due to the tapered surfaces 3a and 4a the sleeve element 3 expands somewhat in the radial direction providing a tight fastening to the inner surface of the bores 1a and 2a. When a sufficient tightness is reached, the piston member 7 and the supporting sleeve 6 can be removed, whereby the joint is completely assembled. It is not necessary to install a screw bolt permanently in the hole 5 to ensure the joint between the adapting bolt 4 and the sleeve element 3 remains in place.

According to FIG. 2, the assembling of the joint between the adapting bolt 4 and the sleeve element 3 is accomplished mechanically by using a tightening screw bolt 12 having external screwthreads and a support piece 13 having a shoulder which engages the sleeve element 3. The tightening screw bolt 12 is inserted through a hole 13a in the support piece 13 and the threads of the screw bolt engage the threads 5a of the hole 5 in the adapting bolt 4. By turning the tightening screw bolt 12, the head of the screw bolt engages the support piece 13 and exerts a force between the sleeve element 3 and the adapting bolt 4, pulling the adapting bolt to the left of the figures relative to the sleeve element. When sufficient tightness is reached, the parts 12 and 13 can be either left in place or removed according to need.

In FIG. 3 disassembling of the joint is shown. For this purpose, the arrangement includes a separate end piece 10 which is inward of the sleeve element 3 in the bores 1a and 2a and is provided with a through-going hole 10a aligned with the hole 5 and having internal threads 10b. The end piece 10 is also provided with a cavity or recess 10c, which is surrounded by an annular abutment shoulder engaging the sleeve element 3 and is large enough to allow movement of the adapting bolt 4 axially to the right in the figure relative to the end piece 10 for detaching the adapting bolt 4 from the sleeve element 3. A support piece 16 engages the adapting bolt 4 and a screw bolt 14 with a threaded pin part 14a is inserted through a hole in the support piece 16 and the hole 5 in the adapting bolt 4 and engages the threads 10b of the hole 10a. A thrust bearing included in the support piece 16 facilitates the turning of the screw bolt 14 relative to the support piece 16. A pin 11 prevents the end piece 10 from turning relative to the adapting bolt 4. By turning the screw bolt 14, the adapting bolt 4 moves to the right in the figure relative to the sleeve element 3 and enters the cavity 10c of the end piece 10 and is released from the sleeve element, whereby the joint is disassembled.

The figures show only one adapting bolt and a sleeve element arranged in cooperation therewith, but when applying the invention, several angularly spaced joints are naturally used to fasten the flanges of the shafts to be coupled.

The invention is not restricted to the embodiments shown but several modifications are feasible within the scope of the attached claims.

I claim:

1. An article of manufacture comprising:
a first shaft provided with a flange having a through bore,
a second shaft provided with a flange having a blind bore aligned with the through bore in the flange of the first shaft,
a coupling device including an adapting bolt having an external tapered surface and an axial hole open at the narrower end of the adapting bolt and a cylindrical sleeve element having an internal tapered surface corresponding to the external tapered surface of the adapting bolt, the adapting bolt being within the sleeve element and the coupling device being located in the aligned bores so that the narrower end of the adapting bolt is toward the flange of the first shaft and an end surface of the sleeve element is exposed through the bore in the flange of the first shaft,
a means for engaging the adapting bolt at the axial hole and applying a force tending to displace the adapting bolt relative to the sleeve element in the direction from the wider end of the adapting bolt toward the narrower end thereof, and
a separate end piece in the blind bore and having an annular abutment shoulder for engaging the sleeve element and surrounding a recess for receiving the adapting bolt with a clearance fit, whereby the adapting bolt can be moved relative to the sleeve element in the direction from the narrower end of the adapting bolt toward the wider end thereof without interference from the end piece.

2. An article according to claim 1, wherein the axial hole in the adapting bolt is internally threaded and the means for engaging the adapting bolt is a threaded member for threaded engagement with the adapting bolt.

3. An article according to claim 1, wherein the adapting bolt is shorter than the combined thickness of the flanges and the adapting bolt is tapered over its entire length.

4. An article according to claim 1, wherein the adapting bolt and the sleeve element are of substantially equal length.

5. An article according to claim 4, wherein the axial hole in the adapting bolt is a through hole and the end piece is formed with a hole aligned with the axial through hole in the adapting bolt, the hole in the end piece being threaded for engaging a tool for releasing the coupling.

6. An article according to claim 5, comprising a means for preventing turning of the end piece relative to the adapting bolt.

7. An article according to claim 4, comprising a means for preventing turning of the end piece relative to the adapting bolt.

8. A method for coupling a first shaft provided with a flange having a through bore and a second shaft provided with a flange having a blind bore aligned with the through bore in the flange of the first shaft, said method comprising:
(a) providing a coupling device including an adapting bolt having an external tapered surface and an axial hole which is internally threaded and is open at the narrower end of the adapting bolt, the coupling device also including a cylindrical sleeve element having an internal tapered surface corresponding to the external tapered surface of the adapting bolt, the adapting bolt being within the sleeve element,
(b) fitting the coupling device in the aligned bores so that the narrower end of the adapting bolt is toward the flange of the first shaft and an end surface of the sleeve element is exposed,
(c) fitting a tool in the axial hole in the adapting bolt, the tool being a hydraulic tool which comprises a cylindrical supporting sleeve engaging the sleeve element, a piston member hydraulically moveable with respect to the supporting sleeve, and an externally threaded piston rod coupled to the piston member and in threaded engagement with the adapting bolt, and
(d) applying a force to the tool tending to displace the adapting bolt relative to the sleeve element in the direction from the wider end of the adapting bolt toward the narrower end thereof.

9. A method according to claim 8, further comprising, between step (a) and step (b), installing an end piece in the aligned bores ahead of the coupling device for use in applying a force tending to displace the adapting bolt relative to the sleeve element in the direction from the narrower end of the adapting bolt toward the wider end thereof.

10. A method according to claim 9, wherein the axial hole in the adapting bolt is a through hole and the end piece is formed with an internally threaded hole aligned with the through hole in the adapting bolt and the method further comprises, after step (c), the additional step of releasing the coupling of the first and second shafts by inserting a screw bolt into the through hole in the adapting bolt, holding the end piece against rotation relative to the adapting bolt, and rotating the screw bolt relative to the adapting bolt in a direction to bring the screw bolt into threaded engagement with the hole in the end piece and force the adapting bolt relative to the sleeve element in the direction from the wider end of the adapting bolt toward the narrower end thereof.

11. A method for coupling a first shaft provided with a flange having a through bore and a second shaft provided with a flange having a blind bore aligned with the through bore in the flange of the first shaft employing a coupling device including an adapting bolt having an external tapered surface and an axial hole open at the narrower end of the adapting bolt and a cylindrical sleeve element having an internal tapered surface corresponding to the external tapered surface of the adapting bolt, the adapting bolt being within the sleeve element, and the method comprising:

(a) installing an end piece in the aligned bores, (b) fitting the coupling device in the aligned bores behind the end piece so that the narrower end of the adapting bolt is toward the flange of the first shaft and an end surface of the sleeve element is exposed, (c) fitting a tool in the axial hole in the adapting bolt, and (d) applying a force to the tool tending to displace the adapting bolt relative to the sleeve element in the direction from the wider end of the adapting bolt toward the narrower end thereof, and wherein the end piece can be used in applying a force tending to displace the adapting bolt relative to the sleeve element in the direction from the narrower end of the adapting bolt toward the wider end thereof.

12. A method according to claim 11, wherein the axial hole in the adapting bolt is a through hole and the end piece is formed with an internally threaded hole aligned with the through hole in the adapting bolt and the method further comprises, after step (c), the additional step of releasing the coupling of the first and second shafts by inserting a screw bolt into the through hole in the adapting bolt, holding the end piece against rotation relative to the adapting bolt, and rotating the screw bolt relative to the adapting bolt in a direction to bring the screw bolt into threaded engagement with the hole in the end piece and force the adapting bolt relative to the sleeve element in the direction from the wider end of the adapting bolt toward the narrower end thereof.

13. A method according to claim 11, wherein the axial hole in the adapting bolt is internally threaded and the tool fitted in step (c) is a hydraulic tool which comprises a cylindrical supporting sleeve engaging the sleeve element, a piston member hydraulically moveable with respect to the supporting sleeve, and an externally threaded piston rod coupled to the piston member and in threaded engagement with the adapting bolt.

14. A method according to claim 11, wherein the axial hole in the adapting bolt is internally threaded and the tool fitted in step (c) is a mechanical tool which comprises a support piece engaging the sleeve element and an externally threaded screw bolt extending through the support piece and in threaded engagement with the hole in the adapting bolt.

* * * * *

UNITED STATES PATENT AND TRADEMARK OFFICE
CERTIFICATE OF CORRECTION

| | |
|---|---|
| PATENT NO. | : 6,039,497 |
| APPLICATION NO. | : 08/911104 |
| DATED | : March 21, 2000 |
| INVENTOR(S) | : Lars Gullberg |

Page 1 of 1

It is certified that error appears in the above-identified patent and that said Letters Patent is hereby corrected as shown below:

Column 4, line 32 (claim 5, line 1), "4" should be deleted and replaced with --1--.
Column 4, line 40 (claim 7, line 1), "4" should be deleted and replaced with --1--.

Signed and Sealed this

Sixteenth Day of October, 2007

JON W. DUDAS
*Director of the United States Patent and Trademark Office*